(No Model.)
T. B. JEFFERY.
BICYCLE FORK HEAD JOINT AND BEARING.
No. 574,906. Patented Jan. 12, 1897.
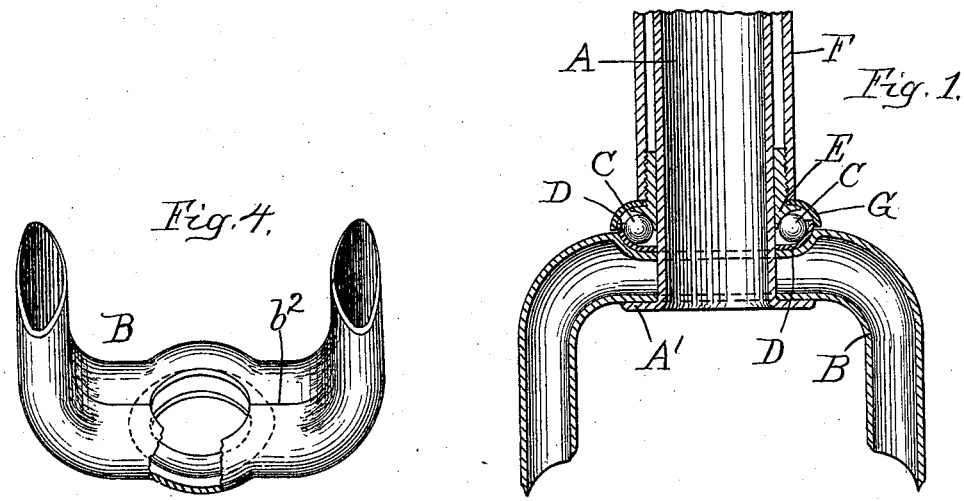
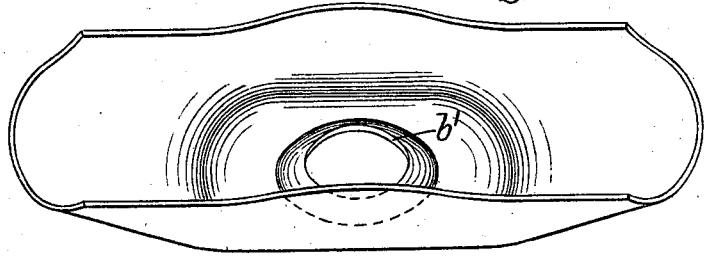
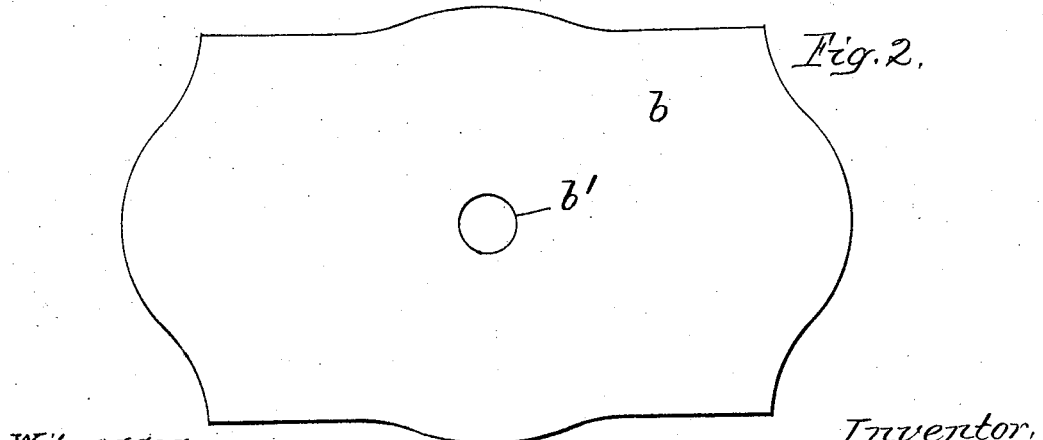
Witnesses,
E. T. Wray.
Jean Elliott
Inventor,
Thomas B. Jeffery
by Burton & Burton
his Attys

UNITED STATES PATENT OFFICE.

THOMAS B. JEFFERY, OF CHICAGO, ILLINOIS.

BICYCLE-FORK-HEAD JOINT AND BEARING.

SPECIFICATION forming part of Letters Patent No. 574,996, dated January 12, 1897.

Application filed November 11, 1895. Serial No. 568,519. (No model.)

*To all whom it may concern:*

Be it known that I, THOMAS B. JEFFERY, a citizen of the United States, residing at Chicago, county of Cook, and State of Illinois, have invented certain new and useful Improvements in Bicycle-Fork-Head Joints and Bearings, which are fully set forth in the following specification, reference being had to the accompanying drawings, forming a part thereof.

The purpose of this invention is to provide an improved joint at the head of the steering-fork and bicycle where the stem of the fork is joined to the branches and where the ball-bearing of the fork against the head is located.

It consists in the features of construction particularized in the claims.

In the drawings, Figure 1 is a transverse section through a fork-head and bearing having my improvements. Fig. 2 is a plan of a blank from which the fork-arms are made. Fig. 3 shows a subsequent stage of the process of formation of the cross-arms preparatory to joining the stem thereto. Fig. 4 is a perspective of the same part completed preparatory to joining it to the stem.

A is the fork-stem; B, the cross head or fitting, to which the fork-arms are secured by brazing.

C C are balls pertaining to the ball-bearing between the fork and steering-head.

D is the lower ball-seat; E, the upper ball-seat, which terminates the steering-head F.

G is a dust cap or guard on the steering-head, which overhangs the ball-case, lapping by the upper edge of the lower ball-seat D and thereby closing the ball-case on account of wear.

At the junction of the arms and stem of the bicycle-fork a very rigid and secure joint is necessary. In all bicycle construction lightness is desired at every point where it can be obtained without sacrifice of necessary strength. On account of the extreme strain to which the joint at this point in the bicycle-frame is subjected; it has been customary to make the fitting for this junction from a solid cast cross-head, to whose stem and the ends of its cross-arm the fork stem and arms are secured, the cross-head being bored out both as to the stem and cross-arm to properly lighten it. This is an expensive process, and a fitting so made cannot be made so light, consistently with proper strength, as one formed of sheet metal which is wrought or rolled to the requisite thickness instead of being cut away by boring or turning to such thickness. I therefore make this fitting of two parts, both of which are of the preferred class of metal, wrought or rolled, the stem A being made of drawn-steel tubing, and the cross-head B being made of rolled-steel plate, first cut into the proper form of blank and then shaped in dies until reduced to the desired tubular form of the cross-head.

An important reason for employing the steel plate for the cross-head, instead of employing steel tubing, will be found in the necessity or desirability of providing a support for the ball-seat on the cross-head accurately shaped to conform to such seat. The necessity of employing plate instead of tubing for this reason will more fully appear as the description of the process of uniting the stem and cross-head proceeds.

To form the cross-head, I use, as stated, a blank, (shown in Fig. 2 and indicated by the letter $b$.) The central opening $b'$ being preferably first punched in this blank it is then cupped, as shown in Fig. 3. In this form, while open on the side which will constitute the lower side of the cross-head when it is secured to the stem, it can be placed between suitable dies, by which the metal about the margin of the aperture $b'$ can be struck out of the normal plane, as by being depressed or sunken in the form shown in Fig. 3, conformed to the ball-seat as desired. After forming this ball-seat support at the margin of the central aperture the cross-head is folded up and its ends bent to the completed form seen in Figs. 1 and 3, the edges meeting and being brazed at the junction-line $b^2$. An aperture being then cut to fit the stem at the lower side, thus joined up, in line with the aperture $b'$, the stem is inserted through both apertures and united by brazing to the margins of both. In order to make more secure the union of the stem with the cross-head, the lower end of the former is preferably flared, forming a flange A', which seats upon the under surface of the cross-head, and is brazed thereto at the same time as the other brazed junction between the two parts is effected.

I do not limit myself to forming the support for the ball-seat by depressing the metal around the margin of the aperture $b'$, though, specifically, this is the superior form, in that it enables me to locate the ball-bearing at the lowest possible point; but, more broadly considered, the invention at this point consists in utilizing the marginal metal in the formation of an accurately-shaped support for the ball-seat, conformed thereto, in whichever direction the metal is pressed from its normal plane to give it this shape, the arching of the metal of the cross-head, so that the lateral pressure of the balls is received against it, preventing the tendency of such strain to cause rupture between the stem and head or between the stem and the ball-seat, and, furthermore, the stiffness produced by thus arching the metal in either direction out of the normal plane being of value in giving rigidity to the support afforded the ball-seat.

In order that the aperture $b'$ may be only of proper diameter to admit the stem after the marginal metal has been shaped as described to support the ball-seat, and that said edge of the aperture may abut closely around the stem and be adapted to be brazed firmly thereto after such shaping, I preferably make the aperture before sinking the arch, and in that case I make the aperture originally of less diameter than the stem, so that enough metal is left to form the support for the ball-seat without unduly stretching it in a manner which would reduce its thickness. On the contrary, although the edge of the aperture is stretched to the larger diameter necessary to admit the stem the amount of metal contained in the annulus which would exist between a circle equal in diameter to the stem and the hole $b'$, which is actually cut in the blank, is crowded into the portion which forms the support for the ball-bearing, and that portion is thereby thickened instead of reduced in thickness in the process of shaping it, as described.

I claim—

1. A tubular frame joint comprising a tubular stem and a hollow cross-head penetrated by the stem, the cross-head being made of sheet metal folded into tubular form having an aperture to admit the stem, and having the metal about the margin of such aperture struck out of its normal plane for a distance back from the stem, the stem being inserted through such aperture and there brazed to the cross-head.

2. In a bicycle, in combination with the steering-head having a ball-seat at its lower end, the steering-fork comprising a tubular stem and hollow cross-head penetrated by the stem, the cross-head being made of sheet metal apertured to admit the stem, and having the metal about the margin of such aperture struck out of its normal plane forming an upwardly-concave annulus, the stem being inserted through said aperture and there brazed to said cross-head; the balls supported by said upwardly-concave annulus, whereby the thrust of the steering-head is transmitted through the balls to the annulus: substantially as set forth.

3. In a bicycle, in combination with the steering-head having a ball-seat at its lower end, the steering-fork comprising a tubular stem, and a hollow cross-head penetrated by the stem, the cross-head being made of sheet metal apertured to admit the stem and having the metal about the margin of the aperture struck inward with respect to the cross-head, forming an upwardly-concave annulus depressed from the upper side of the cross-head and below the normal plane of the metal thereof, and the balls lodged in such depressed annulus: substantially as set forth.

4. In a bicycle, in combination with the steering-head having a ball-seat at its lower end, the steering-fork comprising a tubular stem and a hollow cross-head penetrated by the stem, the cross-head being made of sheet metal apertured to admit the stem and having the metal about the margin of the aperture struck inward with respect to the cross-head, forming an upwardly-concave annulus depressed from the upper side of the cross-head and below the normal plane of the metal thereof; the ball-seat D supported in said depressed annulus and projecting above the outer margin thereof, and the dust-cap secured to the lower end of the steering-head overhanging the balls and depending outside the upwardly-projecting margin of the ball-seat: substantially as set forth.

In testimony whereof I have hereunto set my hand, in the presence of two witnesses, at Chicago, Illinois, this 8th day of November, 1895.

THOS. B. JEFFERY.

Witnesses:
J. J. YOUNG,
GEO. E. SWENSCOE.